(12) United States Patent
Kawakami et al.

(10) Patent No.: US 10,408,334 B2
(45) Date of Patent: Sep. 10, 2019

(54) ATTACHMENT STRUCTURE FOR OIL GUIDE PLATE

(71) Applicant: TOYOTA JIDOSHA KABUSHIKI KAISHA, Toyota-shi (JP)

(72) Inventors: Takaho Kawakami, Susono (JP); Motoki Tabuchi, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/728,542

(22) Filed: Oct. 10, 2017

(65) Prior Publication Data
US 2018/0106358 A1    Apr. 19, 2018

(30) Foreign Application Priority Data

Oct. 14, 2016 (JP) .................................. 2016-202969

(51) Int. Cl.
*F16H 57/04* (2010.01)
*F16H 57/029* (2012.01)

(52) U.S. Cl.
CPC ....... *F16H 57/0423* (2013.01); *F16H 57/029* (2013.01)

(58) Field of Classification Search
CPC ............. F16H 57/0423; F16H 57/0454; F16H 59/0213; F16H 57/029; F16H 57/0472; F16J 15/02; F16J 15/3236; F16J 15/3232
See application file for complete search history.

(56) References Cited

U.S. PATENT DOCUMENTS

| 4,231,266 A * | 11/1980 | Nishikawa .......... F16C 33/6659 184/11.1 |
| 4,348,914 A * | 9/1982 | Kawamoto ........... F16H 3/0915 184/6.12 |
| 5,676,221 A * | 10/1997 | Renk ..................... F16H 57/029 184/6.12 |
| 5,851,387 A * | 12/1998 | Neumann ............ B01D 25/176 210/229 |
| 9,157,518 B2 * | 10/2015 | Mishra ................. F16H 57/029 |
| 9,752,673 B2 * | 9/2017 | Koga ................... F16H 57/0421 |
| 2012/0222517 A1 | 9/2012 | Okuta et al. |
| 2017/0130816 A1 | 5/2017 | Koga |

FOREIGN PATENT DOCUMENTS

| JP | 54-152845 U | 10/1979 |
| JP | 2002-195098 A | 7/2002 |
| JP | 2009-150511 A | 7/2009 |
| JP | 5738004 | 6/2015 |
| JP | 2015-178887 | 10/2015 |

* cited by examiner

*Primary Examiner* — Jeremy R Severson
(74) *Attorney, Agent, or Firm* — Oblon, McClelland, Maier & Neustadt, L.L.P.

(57) ABSTRACT

In an attachment structure for an oil guide plate including an oil guide plate and a seal member, the seal member is disposed at an edge part of the oil guide plate along an outer peripheral end portion, the seal member is an elastic body element protruding from both sides of the oil guide plate in a plate thickness direction, a pair of facing surfaces facing each other and pinching the edge part from both sides of the edge part in the plate thickness direction is disposed in a fixing portion in the case where the oil guide plate is attached, and the fixing portion pinches and compressively deforms the seal member with the pair of facing surfaces and supports the oil guide plate via the seal member.

9 Claims, 10 Drawing Sheets

ATTACHMENT STRUCTURE FOR OIL GUIDE PLATE

INCORPORATION BY REFERENCE

The disclosure of Japanese Patent Application No. 2016-202969 filed on Oct. 14, 2016 including the specification, drawings and abstract is incorporated herein by reference in its entirety.

BACKGROUND OF THE INVENTION

1. Field of the Invention

The invention relates to an attachment structure for an oil guide plate.

2. Description of Related Art

Japanese Unexamined Patent Application Publication No. 2015-178887 (JP 2015-178887 A) discloses a disposition of a resinous oil guide plate in a case accommodating a power transmission device and restriction of a direction in which oil flows between the case and a rotating member of the power transmission device. According to the configuration that is disclosed in JP 2015-178887 A, sealing is provided between the oil guide plate and the case by a seal member disposed in an end portion of the oil guide plate in the case.

SUMMARY OF THE INVENTION

According to the configuration that is disclosed in JP 2015-178887 A, the oil guide plate is made up of a resin member, and thus vibration of the power transmission device might lead to deformation of the oil guide plate. Although the seal member is in contact with an inner surface of the case, a gap might be generated between surfaces of contact (seal surfaces) between the seal member and the case and sealability might be reduced once the oil guide plate is deformed.

The invention provides an attachment structure for an oil guide plate that is capable of improving sealability between a resinous oil guide plate and a case.

An aspect of the invention relates to an attachment structure for an oil guide plate including a case accommodating a power transmission device, an oil guide plate which is a plate-shaped resin member attached to an inner wall of the case, the oil guide plate restricting a direction in which oil flows between the case and a rotating member of the power transmission device in the case, and a seal member providing sealing between the oil guide plate and the case. The seal member is disposed at an edge part of the oil guide plate along an end portion of the oil guide plate. The seal member is an elastic body element protruding from both sides of the oil guide plate in a plate thickness direction and linearly extending along the end portion. A fixing portion to which the oil guide plate is attached is disposed on the inner wall of the case. The fixing portion has a pair of facing surfaces facing each other and pinching the edge part from both sides of the edge part in the plate thickness direction, compressively deforms the elastic body element by pinching the elastic body element with the pair of facing surfaces, and supports the oil guide plate via the elastic body element.

According to the aspect described above, the elastic body element disposed at the edge part of the resinous oil guide plate is pinched and compressively deformed by the pair of facing surfaces disposed on the inner wall of the case. In other words, restoration of the elastic body element from a compressive deformation state can be restricted by the pair of facing surfaces in the fixing portion to which the oil guide plate is fixed. Accordingly, a restoring force of the elastic body element acts on the pair of facing surfaces, the pair of facing surfaces and the elastic body element are brought into close contact with each other, and the oil guide plate can be positioned in the direction in which the restoring force acts (plate thickness direction). As a result, sealability can be improved between the oil guide plate and the case.

In the attachment structure according to the aspect, the case may include a first case member and a second case member, and one of the pair of facing surfaces may be disposed on the first case member. The other one of the pair of facing surfaces may be disposed on the second case member.

According to the aspect described above, the elastic body element which is the seal member can be reliably pinched by the pair of facing surfaces when the case member is assembled. Accordingly, the elastic body element is capable of demonstrating a seal function with reliability and assemblability can be improved.

In the attachment structure according to the aspect, the fixing portion may have a fixing groove provided at least one of the pair of facing surfaces disposed on the first case member and the second case member.

In the attachment structure according to the aspect, the case may include a plurality of case members and the pair of facing surfaces may be a part of a fixing groove provided in one of the case members.

In the attachment structure according to the aspect, the oil guide plate may be fixed by a fixing tool at a location in the case, the location being different from a location of the fixing portion, and the number of the locations of the fixing by the fixing tool may be two or less.

According to the aspect described above, the oil guide plate can be positioned and fixed by the fixing portion and the elastic body element. In addition, the number of the locations of the fixing by the fixing tool can be two or less except for the fixing portion. As a result, the number of fixing tools reduces and cost can be reduced.

In the attachment structure according to the aspect, a through-hole penetrating the edge part in the plate thickness direction and linearly extending along the end portion may be formed at the edge part, and the elastic body element may protrude from both of the sides of the edge part in the plate thickness direction through the through-hole.

In the attachment structure according to the aspect, the through-hole may be intermittently provided along the end portion, and the elastic body element may be intermittently penetrative in a direction along the end portion and may be continuously in contact with one of the pair of facing surfaces in the direction along the end portion.

According to the aspect described above, the elastic body element which is the seal member is continuously in surface contact with at least one of the pair of facing surfaces. In other words, the part where the elastic body element and the pair of facing surfaces are in surface contact linearly and continuously extends. As a result, sealability can be improved between the oil guide plate and the case.

In the attachment structure according to the aspect, the oil guide plate may have an arc shape, and the edge part may have a predetermined width radially inward of an outer peripheral end portion of the oil guide plate and extend in a circumferential direction along the outer peripheral end portion.

In the attachment structure according to the aspect, the fixing portion may support the oil guide plate via the elastic body element in a state where the outer peripheral end portion of the oil guide plate is not in contact with the fixing portion.

In the attachment structure according to the aspect, the number of the fixing portions in the case may be at least two, and the seal member may be arranged in each of the fixing portions.

According to the aspect of the invention, the elastic body element disposed at the edge part of the resinous oil guide plate is pinched and compressively deformed by the pair of facing surfaces disposed on the inner wall of the case in the inner portion of the case accommodating the power transmission device. Accordingly, sealability can be improved between the oil guide plate and the case.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, attachment structures for oil guide plates according to embodiments of the invention will be described in detail with reference to accompanying drawings.

1. First Embodiment 1-1. Overview of Attachment Structure

Figure 1:
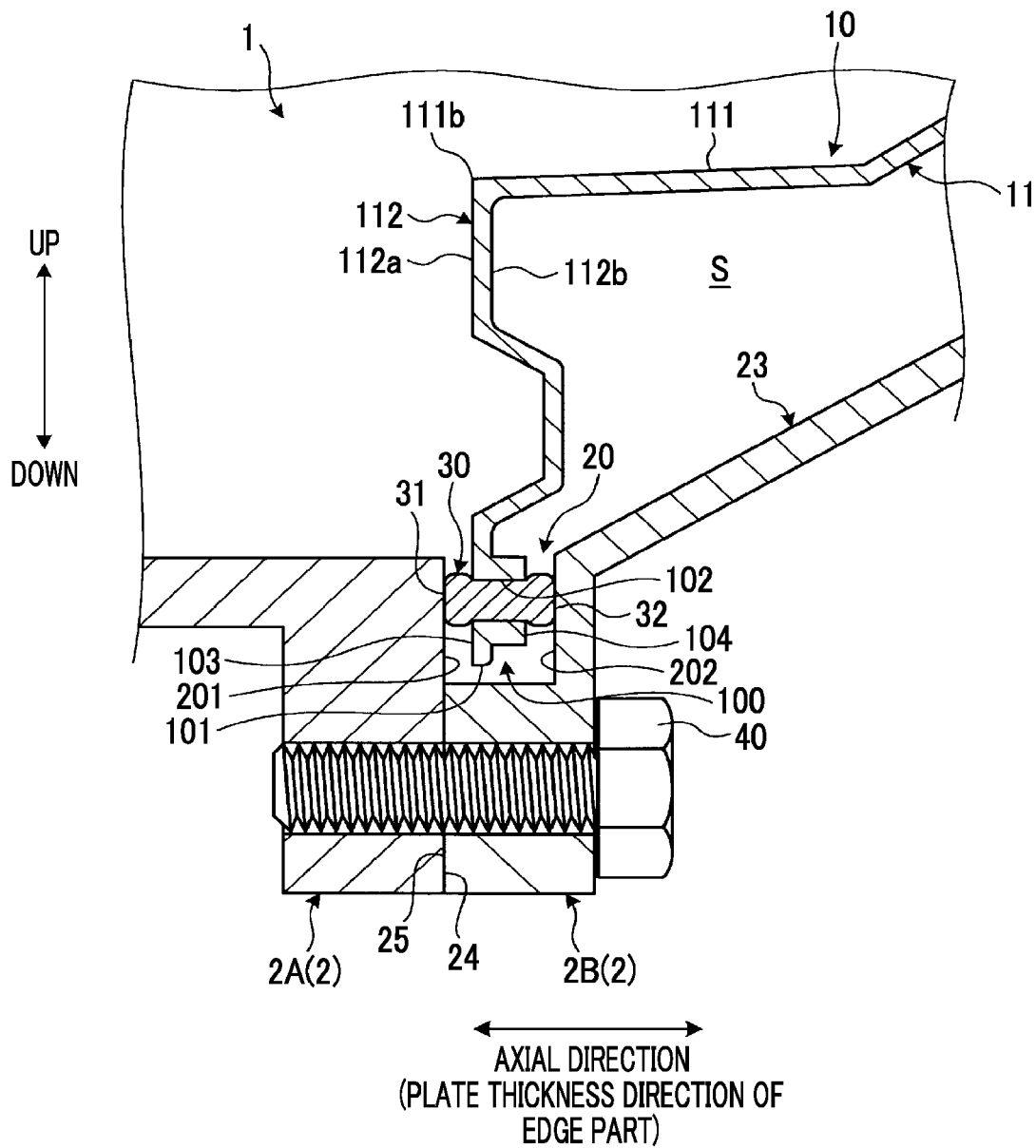
FIG. 1 is a sectional view schematically illustrating an attachment structure for an oil guide plate according to a first embodiment.

An attachment structure for an oil guide plate according to a first embodiment will be described with reference to FIGS. 1 to 6. As illustrated in FIG. 1, an attachment structure 1 according to the first embodiment has a resinous oil guide plate 10 restricting a direction in which oil flows in an inner portion S of a case 2, a fixing portion 20 as a part of the case 2 to which the oil guide plate 10 is attached, and a seal member 30 providing sealing between the oil guide plate 10 and the case 2.

In the first embodiment, two case members 2A, 2B constitute the case 2 and pinch the seal member 30 disposed at an edge part 100 of the oil guide plate 10. A detailed configuration of the attachment structure 1 will be described below.

1-2. Detailed Configuration 1-2-1. Disposition of Case and Oil Guide Plate

Figure 2:
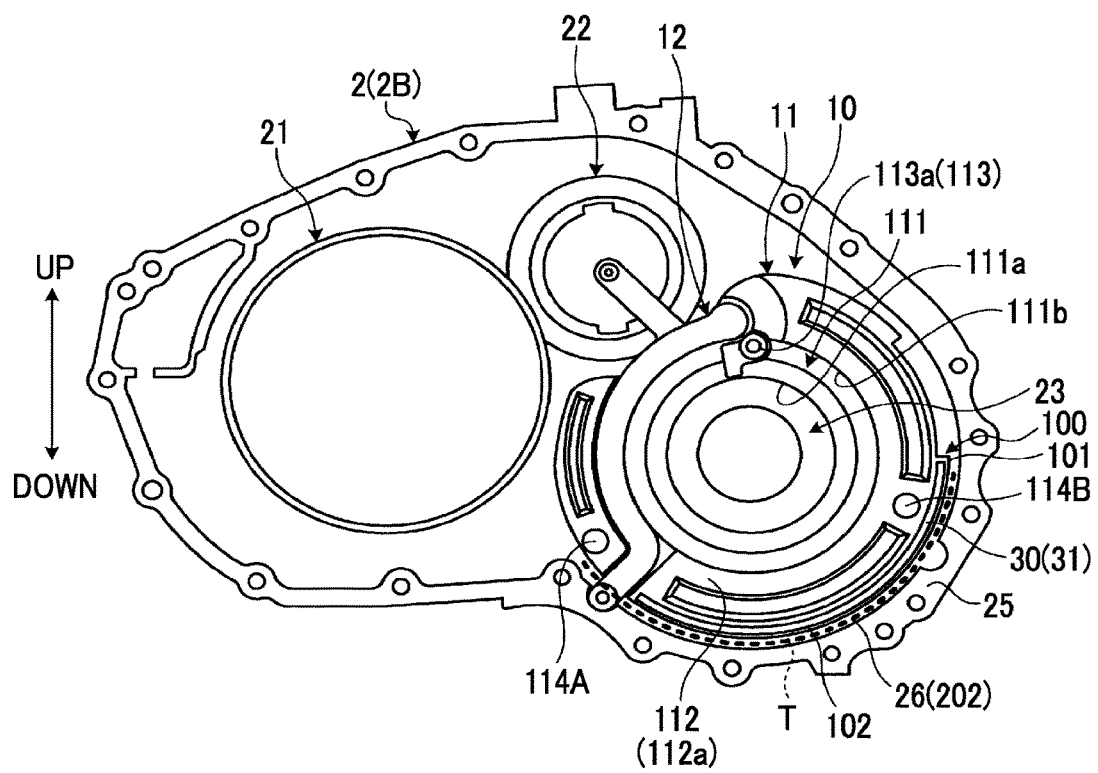
FIG. 2 is a schematic diagram for showing a structure of a case.

The case 2 accommodates a power transmission device (not illustrated) in the inner portion S. A plurality of case members is combined to constitute the case 2. As illustrated in FIGS. 1 and 2, the case 2 is made up of the first case member 2A, the second case member 2B, and a third case member (not illustrated). The first case member 2A is a tubular case main body that is open at both ends. The second case member 2B is a cover member that is attached to one opening portion of the first case member 2A. The third case member is a cover member that is attached to the other opening portion of the first case member 2A. As illustrated in FIG. 1, the first case member 2A and the second case member 2B are fastened by a bolt 40 in the case 2 in a state where the oil guide plate 10 is attached to the inner portion S. The case 2 that is illustrated in FIG. 2 is the second case member 2B that constitutes a front cover as one of the plurality of case members described above. In addition, a plurality of the bolts 40 and a plurality of bolt holes are disposed for the case members to be fastened to one another.

The power transmission device accommodated in the inner portion S of the case 2 is a mechanism that is mounted in a vehicle and transmits power output from an engine to drive wheels. Although not illustrated, the power transmission device is provided with a transmission, a counter gear mechanism, and a differential gear mechanism and is mounted in, for example, a front-engine, front-wheel-drive vehicle. In other words, the case 2 is a transaxle case accommodating a transmission and a differential gear mechanism. The power transmission device transmits the power from the transmission to the differential gear mechanism via the counter gear mechanism on a power transmission path that reaches the drive wheels from the engine. Accordingly, a plurality of rotary shafts (such as a first shaft, a second shaft, and a third shaft) constituting the power transmission device is disposed in the inner portion of the case 2.

As illustrated in FIG. 2, the case 2 includes a first shaft corresponding site 21, a second shaft corresponding site 22, and a third shaft corresponding site 23. The first shaft corresponding site 21 is a part corresponding to the rotary shaft (first shaft) of the transmission. The second shaft corresponding site 22 is a part corresponding to a counter shaft (second shaft) of the counter gear mechanism. The third shaft corresponding site 23 is a part corresponding to an axle (third shaft). The transmission is, for example, made up of a planetary gear mechanism and provided with an input shaft and an output gear disposed on the first shaft on the same axis as the engine. The differential gear mechanism is disposed on the third shaft, and the right and left drive wheels (front wheels) are connected to each other via a drive shaft. The cylindrical oil guide plate 10 is attached to the third shaft corresponding site 23.

Figure 3:
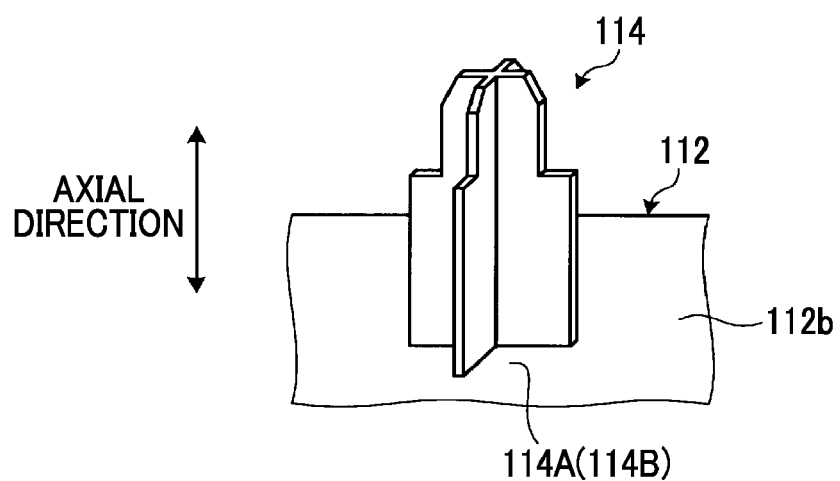
FIG. 3 is a diagram schematically illustrating an example of a fixing projection.

The oil guide plate 10 is attached to an inner wall of the case 2 and is disposed between the differential gear mechanism and the case 2. In other words, the oil guide plate 10 is a resinous baffle plate restricting a direction in which the oil flows between the differential gear mechanism and the case 2. In addition, the oil guide plate 10 is fixed to the case 2 by a plurality of fixing elements disposed at different positions in a circumferential direction of the oil guide plate 10. The plurality of fixing elements includes the seal member 30 as a first fixing element, a fixing tool (not illustrated) as a second fixing element, and a fixing projection 114 (illustrated in FIG. 3) as a third fixing element. As illustrated in FIG. 3, the fixing projection 114 is what is referred to as a fir tree mount.

The fixing projection 114 is not illustrated in FIG. 2. For convenience of description, formation spots 114A, 114B for specifying a position where the fixing projection 114 is formed is illustrated in FIG. 2. The same applies to FIG. 4, which will be described later.

1-2-2. Oil Guide Plate and Seal Member

Figure 4:
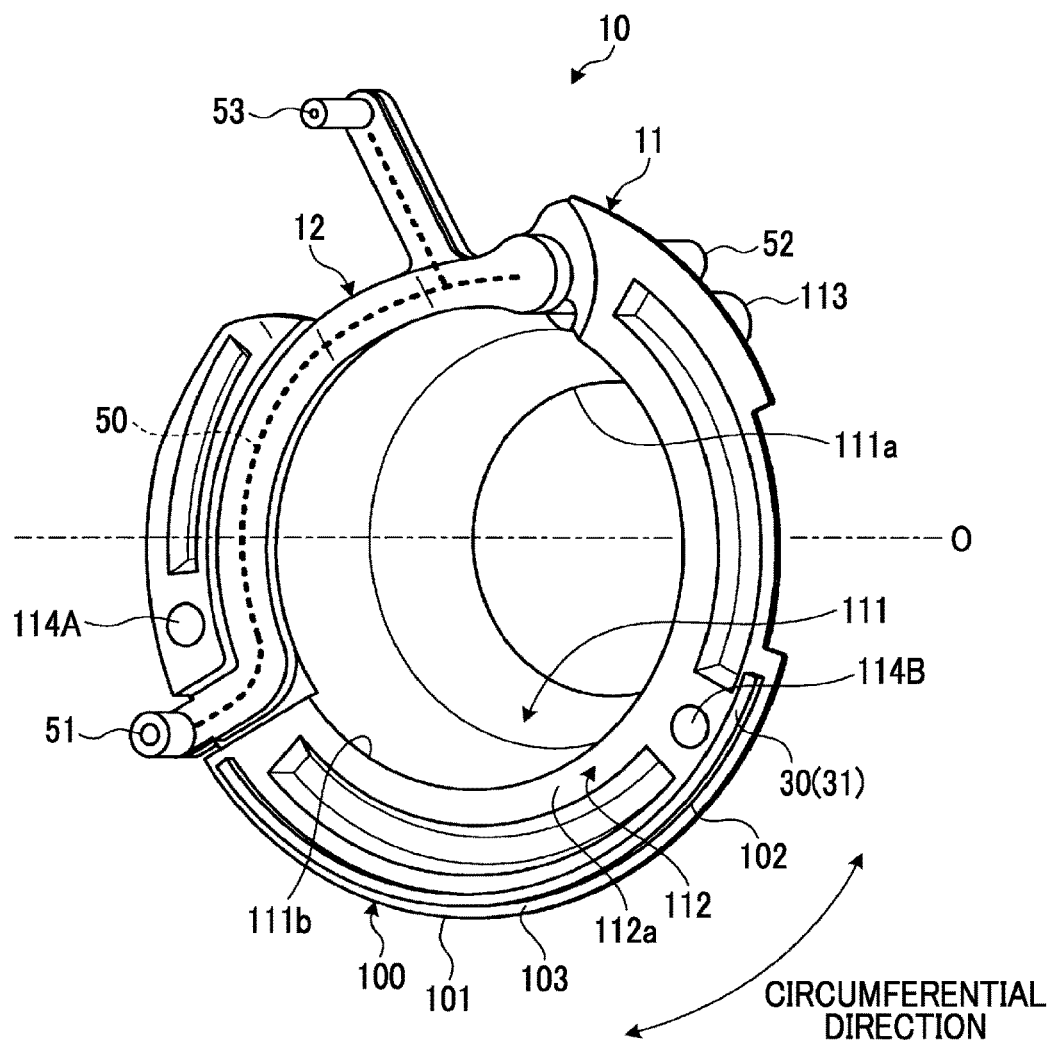
FIG. 4 is a schematic diagram for showing the oil guide plate and a seal member.
Figure 5:
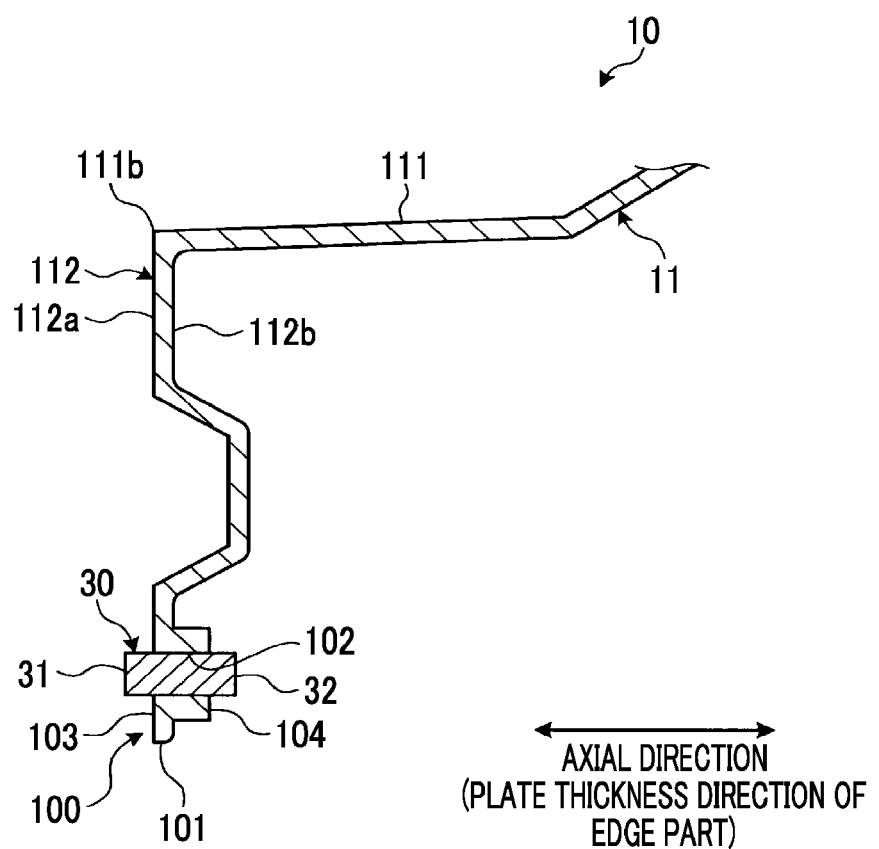
FIG. 5 is a schematic diagram for showing an edge part where the seal member is disposed.

FIG. 4 is a schematic diagram for showing the oil guide plate 10 and the seal member 30. FIG. 5 is a schematic diagram for showing the edge part 100 where the seal member 30 is disposed. In the following description, the direction that is along the one-dot chain line O which is illustrated in FIG. 4 will be described as an "axial direction", and the "circumferential direction" and a "radial direction" will be described by the one-dot chain line O being used as a reference.

As illustrated in FIG. 4, the oil guide plate 10 is a cylindrical baffle plate. The seal member 30 is disposed at the edge part 100 of the oil guide plate 10. The seal member 30 is an elastic body element that is capable of being elastically deformed. As described above, the seal member 30 is a member functioning as the fixing element fixing the oil guide plate 10 to the case 2. The edge part 100 is a part that is attached to the case 2 via the seal member 30. The seal member 30 is formed from a material such as rubber that is softer than the oil guide plate 10.

Specifically, the edge part 100 is a part that has a predetermined width radially inward of an arc-shaped outer peripheral end portion 101 and extends in the circumferential direction along the outer peripheral end portion 101. At the edge part 100, the seal member 30 protrudes from both sides of the edge part 100 in a plate thickness direction and linearly extends in the direction that is along the outer peripheral end portion 101 (circumferential direction). As illustrated in FIG. 5, a through-hole 102 is formed at the edge part 100. The through-hole 102 is a part to which the seal member 30 is attached. The through-hole 102 penetrates the edge part 100 in the plate thickness direction. As illustrated in FIG. 4, the through-hole 102 extends in the direction that is along the outer peripheral end portion 101 (circumferential direction). As illustrated in FIG. 5, the seal member 30 protrudes from both of the sides of the edge part 100 in the plate thickness direction through the through-hole 102.

Specifically, the oil guide plate 10 is a plate-shaped resin member in which a cylindrical plate main body 11 and a curved plate-shaped auxiliary member 12 are integrated with each other. Each of the plate main body 11 and the auxiliary member 12 is a resin member. The plate main body 11 and the auxiliary member 12 are overlapped on each other and vibration-welded. The oil guide plate 10 is an oil passage-attached baffle plate. An oil passage 50 is formed in the oil guide plate 10 by the plate main body 11 and the auxiliary member 12 being overlapped on each other. An oil passage groove (not illustrated) constituting the oil passage 50 is formed in at least one of surfaces (welding surfaces) where the plate main body 11 and the auxiliary member 12 touch each other. For example, the oil passage groove that is formed in the plate main body 11 and the oil passage groove that is formed in the auxiliary member 12 are integrated with each other (vibration-welded) such that the oil passage grooves face each other. The plate main body 11 is provided with a tubular portion 111 and a flange portion 112.

The tubular portion 111 has the shape of a dome with both of its sides in a height direction (axial direction) open. The tubular portion 111 is provided with a first opening portion 111a open to a top portion side of the dome shape and a second opening portion 111b open to a bottom portion side of the dome shape. The tubular portion 111 is shaped such that its diameter is reduced gradually or in a plurality of stages toward the first opening portion 111a from the second opening portion 111b. In other words, the first opening portion 111a is smaller in diameter than the second opening portion 111b.

The flange portion 112 protrudes radially outward of the second opening portion 111b of the tubular portion 111 and extends along the circumferential direction. The flange portion 112 and the tubular portion 111 function as bulkheads restricting the direction in which the oil flows between the case 2 and the differential gear mechanism in the state where the oil guide plate 10 is attached to the case 2 as illustrated in FIG. 1.

The edge part 100 described above is an outer peripheral side of the flange portion 112, and the outer peripheral end portion 101 described above is an outer peripheral end of the flange portion 112. In other words, the outer peripheral end portion 101 has an arc shape, and the seal member 30 is disposed on the outer peripheral end side of the flange portion 112. As illustrated in FIG. 5, a part of a surface 112a of the flange portion 112 on the outer peripheral side is a surface 103 of the edge part 100. A part of the other surface 112b of the flange portion 112 on the outer peripheral side is the other surface 104 of the edge part 100. The flange portion 112 may not protrude radially outward in the same shape over the entire circumference of the second opening portion 111b. The seal member 30 is not disposed over the entire circumference of the outer peripheral end of the flange portion 112. Instead, the seal member 30 is disposed at a part of the flange portion 112 in the circumferential direction. As illustrated in FIG. 2, the seal member 30 is continuously disposed at a lower part of the oil guide plate 10 in the state where the oil guide plate 10 is attached to the case 2.

The auxiliary member 12 is integrated with a part of the flange portion 112. The auxiliary member 12 is welded on the surface 112a side of the flange portion 112. A part of the auxiliary member 12 protrudes radially outward beyond the outer peripheral end of the flange portion 112. In other words, the seal member 30 is disposed at a part of the flange portion 112 to which the auxiliary member 12 is not attached.

As illustrated in FIGS. 2 and 4, a bolt-fixed portion 113 is formed on the plate main body 11. The bolt-fixed portion 113 is fixed to the second case member 2B (case 2) by the fixing tool (bolt) as the second fixing element. The bolt-fixed portion 113 protrudes along the axial direction outside the tubular portion 111, and a bolt hole 113a is disposed in a tip portion of the bolt-fixed portion 113. In the circumferential direction of the oil guide plate 10, the bolt hole 113a (bolt-fixed portion 113) is disposed at a position other than the position where the seal member 30 is disposed as illustrated in FIG. 2. In this case, the oil guide plate 10 is fixed at one spot by the fixing tool such as the bolt.

The fixing projection 114 as the third fixing element is integrally molded in the flange portion 112. The fixing projection 114 is disposed at two different positions (formation spot 114A and formation spot 114B) in the circumferential direction of the oil guide plate 10. The two fixing projections 114 protrude in the same direction. As illustrated in FIG. 3, the fixing projection 114 protrudes in the axial direction from the other surface 112b side of the flange portion 112. The fixing projection 114 is inserted into the case 2 (second case member 2B) and fixes the oil guide plate 10 to the case 2. As illustrated in FIG. 2, the spot where the bolt hole 113a is formed (spot fixed by the second fixing element) and the two spots where the fixing projections 114 are formed (formation spots 114A, 114B) are disposed at positions at a predetermined distance (equidistantly, for example) in the circumferential direction of the oil guide plate 10. In this manner, the oil guide plate 10 is fixed to the case 2 at three different points in the circumferential direction, and thus rotation of the oil guide plate 10 in the circumferential direction can be suppressed.

The oil guide plate 10 has the oil passage 50, a supply port 51, a first discharge port 52, and a second discharge port 53. The oil passage 50 is formed in the oil guide plate 10 and communicates with the supply port 51, the first discharge port 52, and the second discharge port 53. The oil passage 50 branches into a path that reaches the first discharge port 52 from the supply port 51 and a path that reaches the second discharge port 53 from the supply port 51. After the oil flows into the oil passage 50 from the supply port 51, the oil is pumped toward the first discharge port 52 and the second discharge port 53 in the oil passage 50 and supplied to lubrication-needed portions (not illustrated) disposed at different positions in the inner portion S of the case 2.

1-2-3. Fixing Portion

As illustrated in FIG. 1, the fixing portion 20 has a pair of facing surfaces 201, 202 facing each other and pinching the edge part 100 of the oil guide plate 10 in the plate thickness direction and is formed by the first case member 2A and the second case member 2B. The first facing surface 201 is a seal surface that is disposed on the first case member 2A and is in surface contact with an end portion 31 of the seal member 30. The second facing surface 202 is a seal surface that is disposed on the second case member 2B and is in surface contact with the other end portion 32 of the seal member 30. A state where the pair of facing surfaces 201, 202 faces each other and pinches the edge part 100 from both of its sides in the plate thickness direction is a state where the first facing surface 201 and one surface of the edge part 100 are not in contact with each other and the second facing surface 202 and the other surface of the edge part 100 are not in contact with each other.

Specifically, the first facing surface 201 is disposed on the same plane as a surface 24 of the first case member 2A touching the second case member 2B. The second facing surface 202 is disposed on a surface recessed in the axial direction from a surface 25 of the second case member 2B touching the first case member 2A. The first facing surface 201 and the second facing surface 202 take the form of surfaces parallel to each other. Each of the first facing surface 201 and the second facing surface 202 is a flat surface orthogonal to the axial direction. The first facing surface 201 and the second facing surface 202 are designed such that their gap (distance in the axial direction) in a state where the first case member 2A and the second case member 2B are assembled with each other has a predetermined length falling short of the natural length (length in the axial direction) of the seal member 30. In short, the pair of facing surfaces 201, 202 is a part of a fixing groove 26 that has a width which allows the elastic deformation of the seal member 30. The fixing groove 26 is formed by the first case member 2A and the second case member 2B. In other words, the fixing portion 20 is the fixing groove 26. The edge part 100 of the oil guide plate 10 is disposed such that it is not in contact with the fixing groove 26.

As illustrated by the dashed line in FIG. 2, a formation range T in the second case member 2B in which the fixing groove 26 (second facing surface 202) is formed is between the outer peripheral end portion 101 of the oil guide plate 10 and the touching surface 25 in the radial direction and extends along the outer peripheral end portion 101 in the circumferential direction such that the formation range T includes at least the range in which the seal member 30 is disposed. In other words, the fixing groove 26 is disposed such that it corresponds to the range in which the seal member 30 is disposed. Although not illustrated, the range in the first case member 2A in which the first facing surface 201 constituting the fixing groove 26 is formed corresponds to the formation range T of the second facing surface 202 described above.

1-3. Attachment Method

Hereinafter, a method for attaching the oil guide plate 10 will be described. A state where the oil guide plate 10 is yet to be attached to the case 2 will be described first with reference to FIG. 6, and then a state following the attachment of the oil guide plate 10 to the case 2 will be described with reference to FIG. 1. The shape of the seal member 30 changes through the attachment of the oil guide plate 10.

1-3-1. Before Attachment

Figure 6:
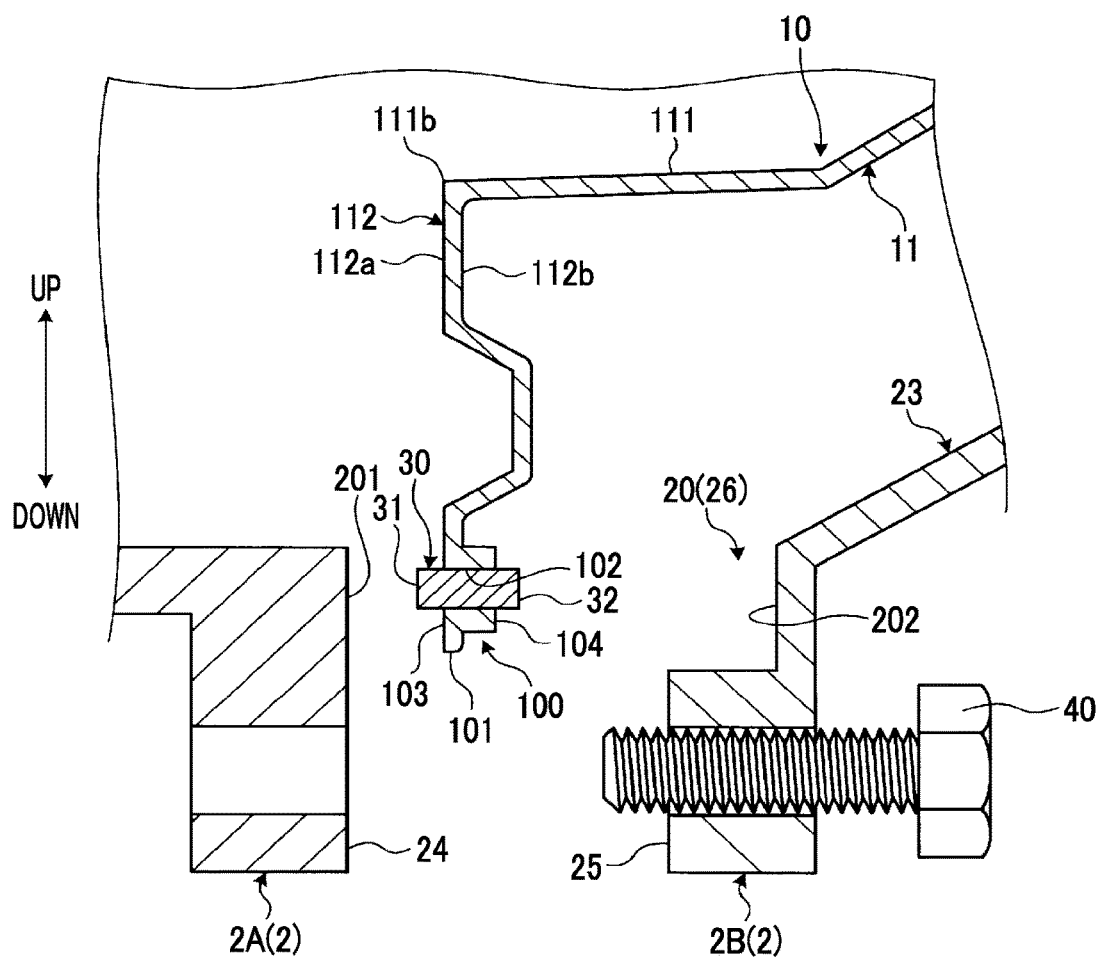
FIG. 6 is a schematic diagram for showing a state where the oil guide plate is yet to be attached.

As illustrated in FIG. 6, the seal member 30 maintains its natural length without any elastic deformation in the state where the oil guide plate 10 is yet to be attached to the case 2. When the case 2 is assembled, the first case member 2A and the second case member 2B are fastened by the bolt 40 with both of the end portions 31, 32 of the seal member 30 pinched by the pair of facing surfaces 201, 202. For example, the bolt-fixed portion 113 of the oil guide plate 10 is fastened to the second case member 2B by the bolt. In addition, the fixing projection 114 is inserted into the second case member 2B, and then the first case member 2A and the second case member 2B are fastened by the bolt with both of the end portions 31, 32 of the seal member 30 pinched by the pair of facing surfaces 201, 202.

1-3-2. After Attachment

As illustrated in FIG. 1, the seal member 30 undergoes a compressive deformation by being pinched by the pair of facing surfaces 201, 202 in the state following the attachment of the oil guide plate 10 to the case 2. In this case, the seal member 30 is compressed in the plate thickness direction of the edge part 100 by the axial force (tightening force) by which the first case member 2A and the second case member 2B are fastened by the bolt 40. The seal member 30 undergoes the compressive deformation for the axial force because the case 2 is metallic and the seal member 30 is the elastic body element. The compressed seal member 30 is deformed to become larger in size than the opening of the through-hole 102 at the edge part 100. The deformation occurs on the surface 103 side and the other surface 104 side of the edge part 100 alike. Accordingly, the edge part 100 is positioned exactly in the middle of the fixing portion 20 in the axial direction. In other words, restoration of the seal member 30 from its compressive deformation state can be restricted by the pair of facing surfaces 201, 202 in the fixing portion 20 where the oil guide plate 10 is fixed. The restoring force of the seal member 30 acts on the pair of facing surfaces 201, 202, and thus the oil guide plate 10 can be positioned in the direction in which the restoring force acts (axial direction/plate thickness direction of the edge part 100). In this manner, the oil guide plate 10 is center-aligned (centered) in the fixing portion 20 by the seal member 30 being compressively deformed in the plate thickness direction.

During the assembly of the case 2, the outer peripheral end portion 101 of the oil guide plate 10 is disposed such that it is not in contact with the fixing portion 20. In other words, the fixing portion 20 supports the oil guide plate 10 via the seal member 30 by the pair of facing surfaces 201, 202 pinching the seal member 30. Accordingly, vibration of the case 2 (first case member 2A and second case member 2B) is transmitted to the oil guide plate 10 via the seal member 30 as the elastic body element. As a result, deformation of the resinous oil guide plate 10 that is attributable to vibration generated by the power transmission device accommodated in the inner portion S of the case 2 can be suppressed. In addition, the seal surfaces can be brought into close contact by the restoring force of the seal member 30 since the seal member 30 is pinched by the pair of facing surfaces 201, 202 and compressively deformed. As a result, gap generation between the surfaces of contact (seal surfaces) between the seal member 30 and the case 2 that is attributable to deformation of the oil guide plate 10 can be suppressed.

As described above, the seal member 30 disposed in the oil guide plate 10 is pinched by the pair of facing surfaces 201, 202 and compressively deformed in the inner portion S of the case 2 accommodating the power transmission device in the attachment structure 1 according to the first embodiment. Accordingly, sealability can be ensured between the resinous oil guide plate 10 and the case 2. As a result, the oil can be guided to a desired position by the oil guide plate 10, and thus the seizure resistance of the power transmission device can be improved and the reliability of the power transmission device can be improved. In addition, excessive oil flow to a rotating member (lubrication-needed site) of the power transmission device can be suppressed, and thus drag torque can be reduced and fuel economy can be improved.

The oil guide plate 10 is positioned (positioned in the axial direction) by the seal member 30 compressively deformed on both surface sides of the edge part 100 and fixed to the fixing portion 20 of the case 2. In other words, the seal member 30 demonstrates a seal function and a positioning function. As a result, dropping of the oil guide plate 10 from the case 2 can be prevented. Accordingly, fixing tools such as bolts can be reduced. For example, costs such as material costs can be lower than in a case where a bolt hole and a bolt seat are disposed in the formation range T of the fixing portion 20. In addition, bolt fastening does not have to be performed, and thus assembly man-hour reduction can be achieved.

During the assembly of the case 2, the seal member 30 as a whole can be uniformly compressed by the pair of facing surfaces 201, 202. Accordingly, the seal function and the positioning function of the seal member 30 can be demonstrated with reliability. As a result, assemblability can be improved and oil leak from the seal surface between the fixing portion 20 and the seal member 30 can be suppressed, which leads to fuel economy improvement.

The rigidity of the oil guide plate 10 can be compensated for by the seal member 30 pinched in the fixing portion 20. In other words, a lower level of rigidity can be set for the oil guide plate 10 than in a case where the seal member 30 is not disposed. As a result, a rib for reinforcing the rigidity of the oil guide plate 10 is dispensable, the plate thickness of the oil guide plate 10 can be reduced, and thus material cost reduction can be achieved. In addition, the size and weight of the case 2 can be reduced because the oil guide plate 10 can be fixed in the installation space that is limited to the inner portion of the case 2.

The edge part 100 and the outer peripheral end portion 101 are not in contact with the fixing portion 20 (fixing groove 26). Accordingly, a direct collision of the edge part 100 and the outer peripheral end portion 101 with a surrounding element relatively harder than the oil guide plate 10, such as the case 2, during vibration of the oil guide plate 10 can be suppressed by the seal member 30. In other words, the seal member 30 functions as a cushioning material between the oil guide plate 10 and the case 2. As a result, damage to and wear of the oil guide plate 10 can be suppressed and abnormal sound generation in the inner portion S of the case 2 that is attributable to vibration of the oil guide plate 10 can be suppressed.

Figure 7A:
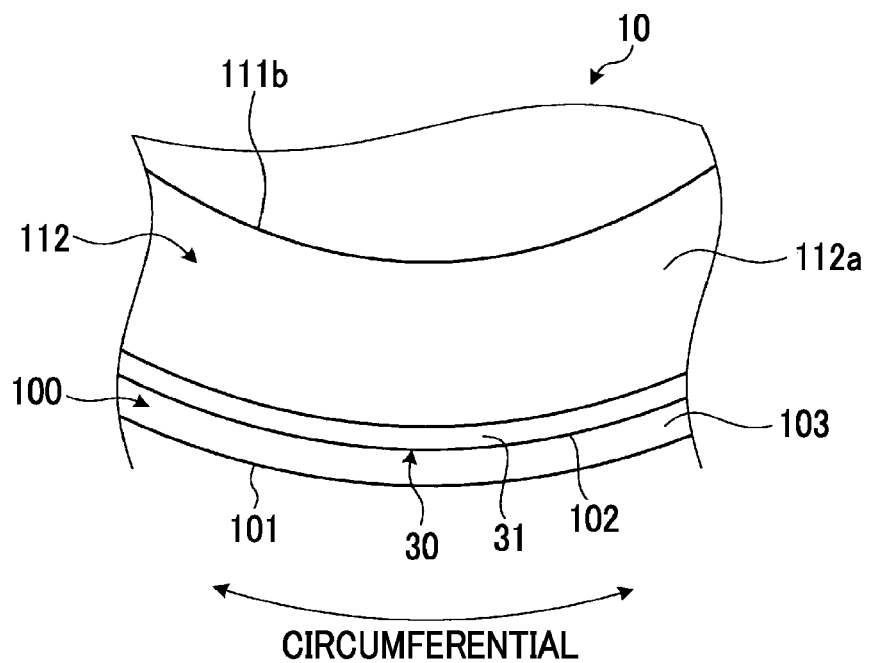
FIG. 7A is a diagram for showing a disposition of the seal member on one surface of the oil guide plate.
Figure 7B:
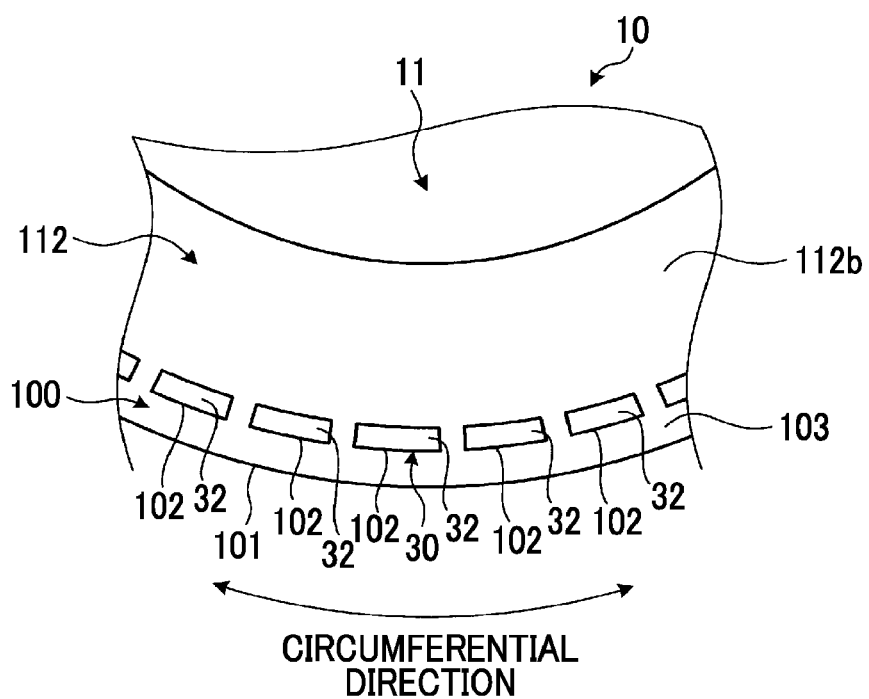
FIG. 7B is a diagram for showing a disposition of the seal member on the other surface of the oil guide plate.

The seal member 30 may be continuously in contact with at least one of the pair of facing surfaces 201, 202. Accordingly, the shape of the seal member 30 and methods for installing the seal member 30 are not limited to the first embodiment described above. For example, the seal member 30 may also be configured to be intermittently penetrative in the direction that is along the outer peripheral end portion 101 as illustrated in FIGS. 7A and 7B. In this case, a plurality of the through-holes 102 is formed at the edge part 100. In addition, the through-holes 102 as a whole intermittently extend in the direction along the outer peripheral end portion 101. Furthermore, the end portion 31 of the seal member 30 extends in series (continuously) along the outer peripheral end portion 101 on the surface 103 side of the edge part 100 as illustrated in FIG. 7A. On the other surface 104 side of the edge part 100, the other end portion 32 of the seal member 30 intermittently extends along the outer peripheral end portion 101 as illustrated in FIG. 7B. Even in a case where the seal member 30 intermittently penetrates the oil guide plate 10 as described above, at least the end portion 31 of the seal member 30 is continuously and linearly in contact with the first facing surface 201, which is one of the pair of facing surfaces 201, 202. In other words, the part where the seal member 30 and the pair of facing surfaces 201, 202 are in surface contact with each other extends in a band shape, and thus the oil guide plate 10 can be fixed to the case 2 by the band-shaped contact part (seal part). As a result, a fixing force for the oil guide plate 10 in the fixing portion 20 can be demonstrated with stability, and a relative axial movement of the oil guide plate 10 with respect to the case 2 can be suppressed. In other words, the oil guide plate 10 can be positioned (positioned in the axial direction) by the fixing portion 20 and the seal member 30 even if a large number of fixing tools such as bolts are not disposed. As a result, cost reduction, assembly man-hour reduction, and weight reduction can be achieved based on fixing tool reduction or the like.

Figure 8:
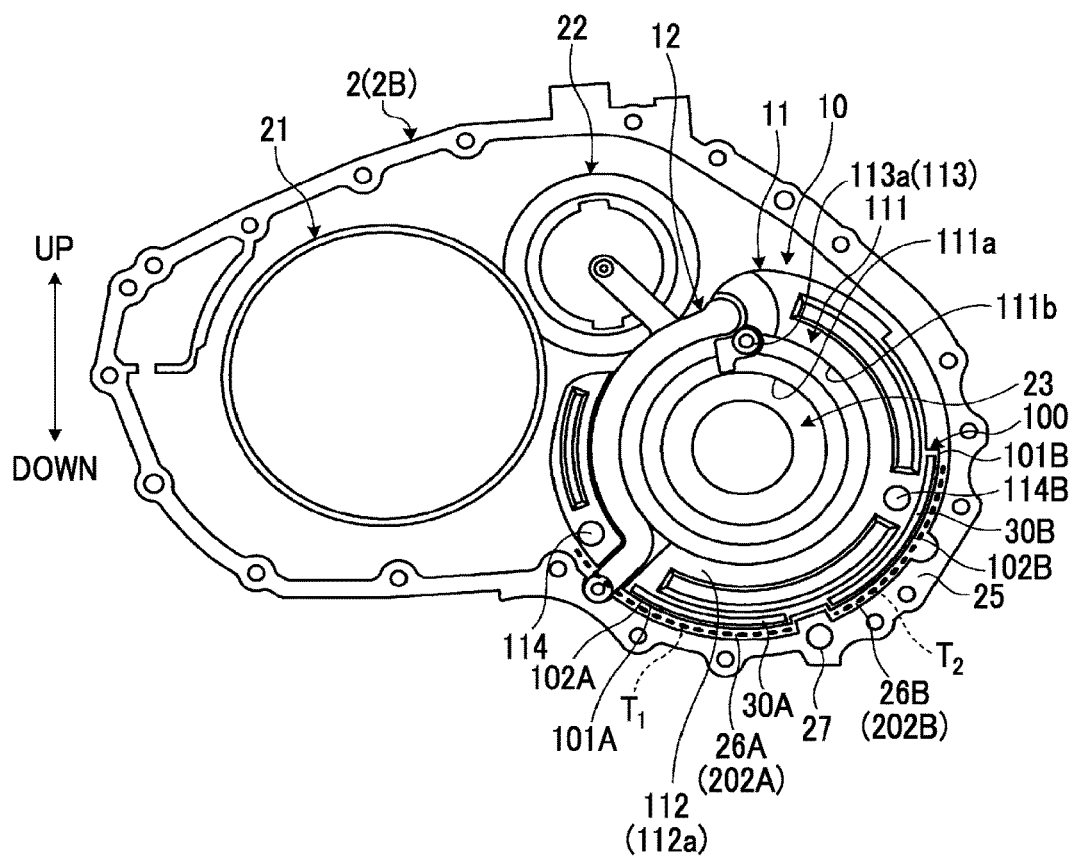
FIG. 8 is a diagram for showing a modification example of the first embodiment.

A plurality of the seal members 30 may be disposed as well. In other words, a plurality of the fixing portions 20 may be disposed at positions (ranges) corresponding to the seal members 30. For example, the fixing portion 20 can be divided into two formation ranges $T_1$, $T_2$ as illustrated in FIG. 8 in a case where a bolt hole 27 formed in the touching surface 25 of the second case member 2B is at a position where the fixing portion 20 is divided. In this case, the seal member 30 of the oil guide plate 10 is also disposed after being divided into two ranges in the circumferential direction.

Specifically, a first fixing groove 26A (second facing surface 202A of first fixing groove 26A) is disposed in the first formation range $T_1$ as illustrated in FIG. 8. Corresponding to the first formation range $T_1$, a first seal member 30A passes through a first through-hole 102A and extends by a predetermined length in the circumferential direction along a first outer peripheral end portion 101A. A second fixing groove 26B (second facing surface 202B of second fixing groove 26B) is disposed in the second formation range $T_2$. Corresponding to the second formation range $T_2$, a second seal member 30B passes through a second through-hole 102B and extends by a predetermined length in the circumferential direction along a second outer peripheral end portion 101B. The fixing portions 20 may be intermittently formed along the outer peripheral end portion 101 of the oil guide plate 10 in this manner. The number of the seal members 30 disposed in the oil guide plate 10 may be two, and the seal member 30 may be disposed at a part of the edge part 100 in the circumferential direction.

The seal member 30 may be integrated with each of both surfaces of the oil guide plate 10 without penetrating the oil guide plate 10, too. For example, the seal member 30 may be integrated with the surface 103 of the edge part 100 and the seal member 30 may be integrated with the other surface 104 of the edge part 100.

Each of the pair of facing surfaces 201, 202 of the fixing portion 20 may be disposed on a plane other than the touching surface. For example, the first facing surface 201 may be formed by a recessed portion recessed from the surface 24 of the first case member 2A touching the second case member 2B. The second facing surface 202 may be formed by a recessed portion recessed from the surface 25 of the second case member 2B touching the first case member 2A. In this case, the seal member 30 may be bonded to a surface of the edge part 100.

The pair of facing surfaces 201, 202 is not limited to the parallel surfaces. The pair of facing surfaces 201, 202 may have a surface shape with which the elastic deformation of the seal member 30 can be absorbed and a close contact state can be maintained for the surfaces of contact (seal surfaces) between the seal member 30 and themselves. Accordingly, the pair of facing surfaces 201, 202 may be uneven surfaces and may not be parallel to each other.

The number of fixing spots where the oil guide plate 10 is fixed to the case 2 by the fixing tool such as the bolt may be two or less except for the spot in the case 2 where the fixing portion 20 is disposed (formation range T described above). For example, a bolt hole may be disposed at the formation spot 114A with both the formation spot 114A and the formation spot 114B of the fixing projection 114 illustrated in FIG. 2 and described above removed. In this case, two spots, one being the bolt-fixed portion 113 and the other one being the formation spot 114A, are bolt-fastened. Even when the number of the bolt-fastened spots is two or less as described above, the oil guide plate 10 still can be fixed via the seal member 30 in the fixing portion 20, and thus the fixing portion 20 functions as a third fixing spot point. In other words, the oil guide plate 10 can be fixed to the case 2 at three different points in the circumferential direction and rotation of the oil guide plate 10 can be suppressed. In addition, the degree of freedom in terms of design of fixing spots depending on fixing tools increases. In a case where the plurality of fixing projections 114 is disposed, for example, the plurality of fixing projections 114 is required to protrude in the same direction without exception, and thus constraints arise on the shapes of the oil guide plate 10 and the case 2. The number of the fixing projections 114, however, can be reduced as described above, and thus no shape-related constraint arises. Accordingly, the shapes of the oil guide plate 10 and the case 2 can be designed with a high degree of freedom, and cost reduction and weight reduction result from the reduction in the number of the fixing projections 114.

2. Second Embodiment

Hereinafter, an attachment structure according to a second embodiment will be described with reference to FIG. 9. In the second embodiment, the fixing portion 20 is disposed in any one of the plurality of case members that constitutes the case 2. In the following description of the second embodiment, the same reference numerals will be used to refer to components similar to those of the first embodiment, and description thereof will be omitted.

Figure 9:
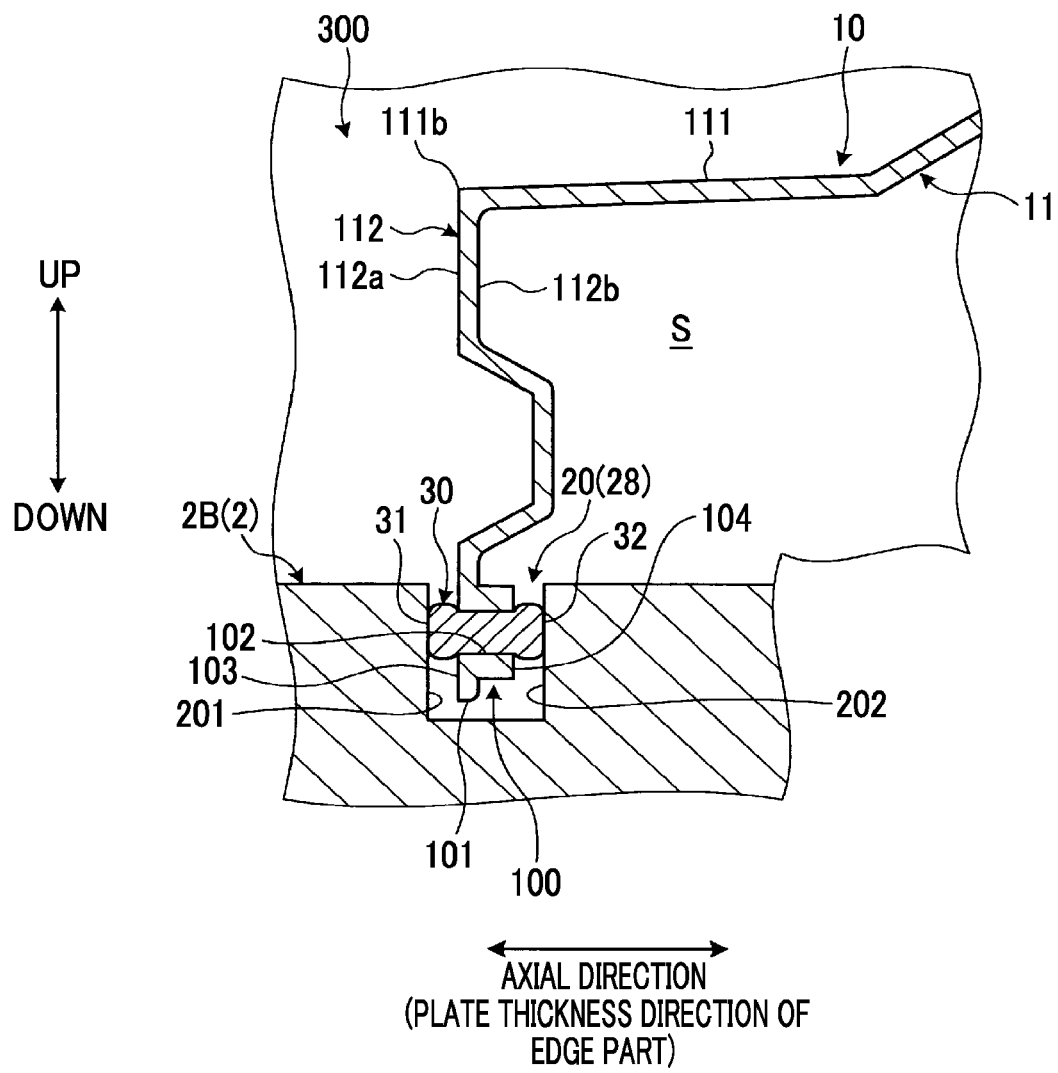
FIG. 9 is a sectional view schematically illustrating an attachment structure for an oil guide plate according to a second embodiment.

In an attachment structure 300 according to the second embodiment, each of the pair of facing surfaces 201, 202 of the fixing portion 20 is disposed in the second case member 2B as illustrated in FIG. 9. In other words, the pair of facing surfaces 201, 202 is formed for the seal member 30 to be pinched by a rectangular fixing groove 28 formed in the second case member 2B. The fixing groove 28 is formed in the inner wall of the second case member 2B and linearly extends.

In the second embodiment, the seal member 30 disposed at the edge part 100 of the oil guide plate 10 is fitted into the fixing groove 28. As a result, the seal member 30 can be pinched and compressively deformed by the pair of facing surfaces 201, 202 as wall surfaces of the fixing groove 28. In other words, the seal member 30 is press-fitted into the fixing groove 28. In this case, the load that results in the compressive deformation of the seal member 30 is based on the shape (groove width) of the fixing groove 28 formed in the second case member 2B. In other words, the second embodiment differs from a case where the seal member is compressively deformed by the axial force (tightening force) by which the case member is bolt-fastened as in the first embodiment.

With the attachment structure 300 according to the second embodiment, the degree of freedom at the place (fixing spot) where the oil guide plate 10 is installed increases. In addition, the oil guide plate 10 can be attached with ease since the seal member 30 may be press-fitted into the fixing groove 28.

The fixing groove 28 may be disposed in the first case member 2A as well as the second case member 2B. In other words, the fixing groove 28 may be disposed in at least any one of the case members as the case 2 is a combination of the plurality of case members.

3. Modification Example

The oil guide plate 10 is not limited to the baffle plate described above. For example, the oil guide plate may be a resinous oil guide attached to the inner wall of the case 2. The oil guide is a member guiding the oil to a desired position (spot of lubrication-needed site) in the inner portion S of the case 2.

Figure 10:
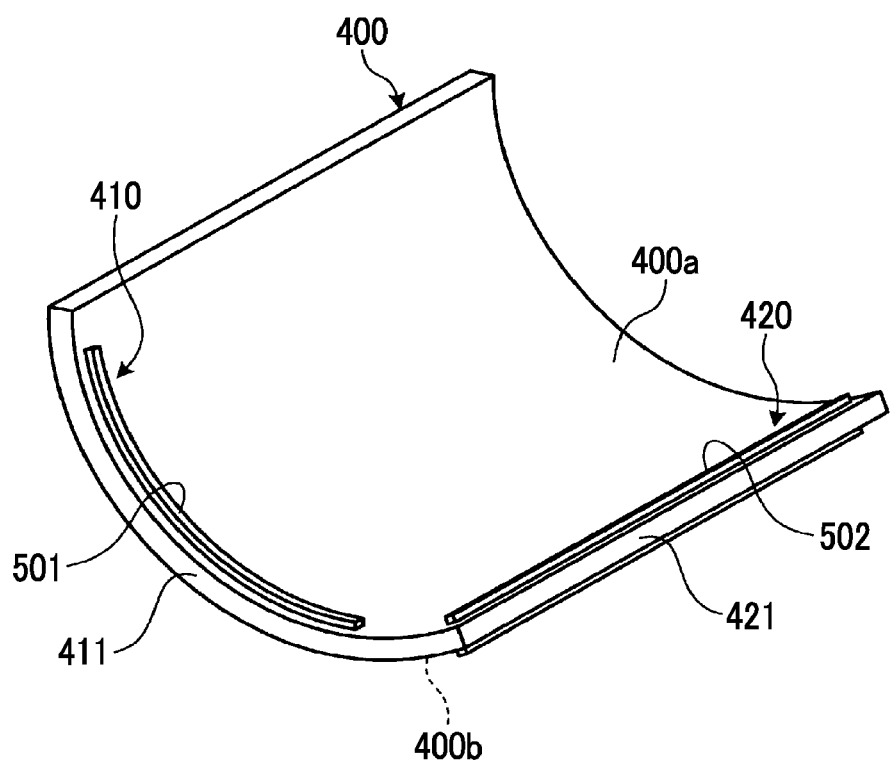
FIG. 10 is a schematic diagram illustrating a modification example of the oil guide plate.

As illustrated in FIG. 10, an oil guide plate 400 according to a modification example is a resinous oil guide that has a semi-cylindrical shape. A first seal member 501 and a second seal member 502 are disposed at two edge parts 410, 420, which are parts of the oil guide plate 400 attached to the case 2. Each of the seal members 501, 502 is an elastic body element as is the case with the seal member 30 described above. The seal members 501, 502 protrude from both surfaces 400a, 400b through the oil guide plate 400.

The first seal member 501 is disposed at the curved first edge part 410 and linearly extends along an arc-shaped first end portion 411. The second seal member 502 is disposed at the linear second edge part 420 and linearly extends along a linear second end portion 421.

In the oil guide plate 400 according to the modification example, the first seal member 501 may not be disposed over the entire region of the first end portion 411. Likewise, the second seal member 502 may not be disposed over the entire region of the second end portion 421. In other words, each of the seal members 501, 502 may be disposed at a part of the oil guide plate 400 where the oil is to be sealed or positioned between the case 2 and itself. The oil guide plate 400 according to the modification example can be attached to both the fixing portion 20 (fixing groove 26) according to the first embodiment described above and the fixing groove 28 according to the second embodiment.

What is claimed is:

1. An attachment structure for an oil guide plate, comprising:
    a case accommodating a power transmission device;
    an oil guide plate being a plate-shaped resin member attached to an inner wall of the case, the oil guide plate restricting a direction in which oil flows between the case and a rotating member of the power transmission device in the case; and
    a seal member providing sealing between the oil guide plate and the case, wherein:
    the seal member is disposed at an edge part of the oil guide plate along an end portion of the oil guide plate;
    the seal member is an elastic body element protruding from both sides of the oil guide plate in a plate thickness direction and linearly extending along the end portion,
    a fixing portion to which the oil guide plate is attached is disposed on the inner wall of the case;
    the fixing portion has a pair of facing surfaces facing each other and pinching the edge part from both sides of the edge part in the plate thickness direction, compressively deforms the elastic body element by pinching the elastic body element with the pair of facing surfaces, and supports the oil guide plate via the elastic body element
    the edge part has a through-hole penetrating the edge part in the plate thickness direction and linearly extending along the end portion; and
    the elastic body element protrudes from both of the sides of the edge part in the plate thickness direction through the through-hole.

2. The attachment structure according to claim 1, wherein:
    the case includes a first case member and a second case member attaching to the first case member;
    one of the pair of facing surfaces is disposed on the first case member; and
    the other one of the pair of facing surfaces is disposed on the second case member.

3. The attachment structure according to claim 2, wherein the fixing portion has a fixing groove provided at least one of a first attaching surface of the first case member and a second attaching surface of the second case member, the second attaching surface being attached to the first attaching surface.

4. The attachment structure according to claim 1, wherein the case includes a plurality of case members and the pair of facing surfaces is a part of a fixing groove provided in one of the case members.

5. The attachment structure according to claim 1, wherein the oil guide plate is fixed by a fixing tool at a location in the case, the location being different from a location of the fixing portion, and the number of the locations of the fixing by the fixing tool is two or less.

6. The attachment structure according to claim 1, wherein:
    the through-hole is intermittently provided along the end portion; and
    the elastic body element is intermittently penetrative in a direction along the end portion and is continuously in contact with one of the pair of facing surfaces in the direction along the end portion.

7. The attachment structure according to claim 1, wherein:
    the oil guide plate has an arc shape; and
    the edge part has a predetermined width radially inward of an outer peripheral end portion of the oil guide plate and extends in a circumferential direction along the outer peripheral end portion.

8. The attachment structure according to claim 7, wherein the fixing portion supports the oil guide plate via the elastic body element in a state where the outer peripheral end portion of the oil guide plate is not in contact with the fixing portion.

9. An attachment structure for an oil guide plate, comprising:
    a case accommodating a power transmission device;
    an oil guide plate being a plate-shaped resin member attached to an inner wall of the case, the oil guide plate restricting a direction in which oil flows between the case and a rotating member of the power transmission device in the case; and
    a seal member providing sealing between the oil guide plate and the case, wherein:
    the seal member is disposed at an edge part of the oil guide plate along an end portion of the oil guide plate;
    the seal member is an elastic body element protruding from both sides of the oil guide plate in a plate thickness direction and linearly extending along the end portion,
    a fixing portion to which the oil guide plate is attached is disposed on the inner wall of the case;
    the fixing portion has a pair of facing surfaces facing each other and pinching the edge part from both sides of the edge part in the plate thickness direction, compressively deforms the elastic body element by pinching the elastic body element with the pair of facing surfaces, and supports the oil guide plate via the elastic body element
    the number of the fixing portions in the case is at least two; and
    the seal member is arranged in each of the fixing portions.

* * * * *